June 29, 1926.
C. G. HALL
HEADLIGHT PROJECTOR
Filed August 16, 1924
1,590,993
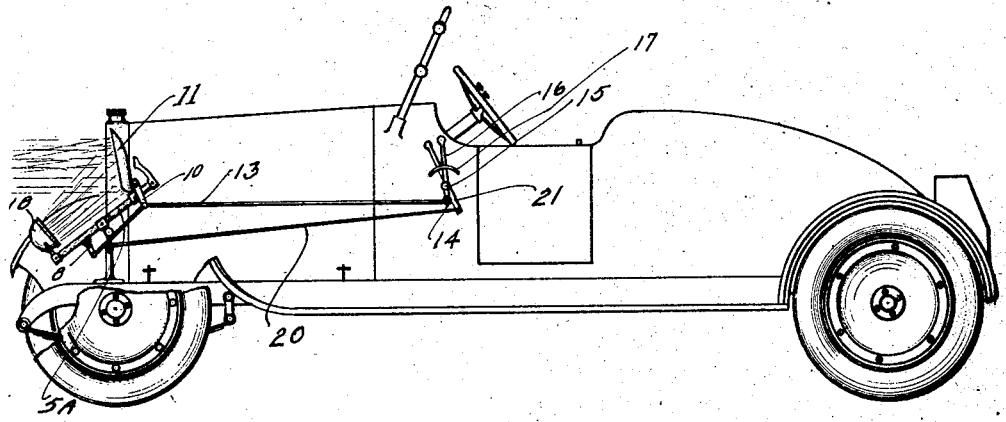
Fig. 1
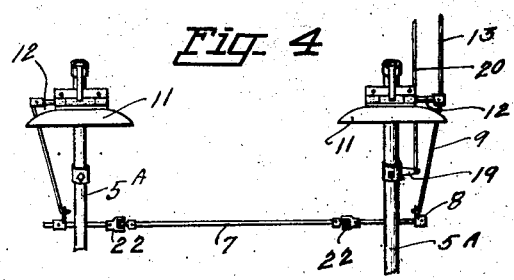
Fig. 4
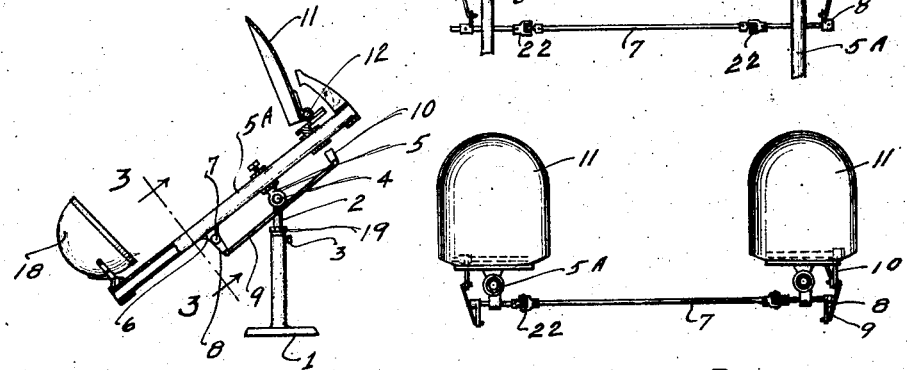
Fig. 2
Fig. 3
Inventor
Charles G. Hall
Attorney Patented June 29, 1926.

1,590,993

UNITED STATES PATENT OFFICE.

CHARLES G. HALL, OF PORTLAND, OREGON.

HEADLIGHT PROJECTOR.

Application filed August 16, 1924. Serial No. 732,471.

My invention is intended for use upon vehicles, such as automobiles, street cars, trains and the like where it is desirable to produce a head light projector that will, in whole, or in part, eliminate the objectionable glare that is inherent in devices heretofore invented.

In my invention I have produced a projector that to a great extent eliminates this objectionable feature, and I accomplish the same by new and novel features comprising the construction of the same, wherein the rays at the point of origin are projected upon a highly polished surface, or upon a mirror, or other glass, or suitable reflecting surface and are then projected and diffused over the surface or pathway, or line of travel that it is desired to illuminate by projected light.

I attain these objects by the mechanism illustrated in the accompanying drawings, in which—

Fig. 1 is a side elevation showing one of my head light projectors in place upon an automobile.

Fig. 2 is a partial sectional, side elevation of the projector shown detached from the point of use.

Fig. 3 is an end or front view taken on line 3—3 of Fig. 2 looking in the direction indicated.

Fig. 4 is a plan view of the mechanism shown in Fig. 2.

Like reference characters refer to like parts throughout the several views.

1 is the table support that may be secured permanently to the vehicle frame, the same being hollow and adapted on its interior to supporting the shank 2 and which is secured thereto, in locked position by the locking screw 3. Journaled in the upper end of the shank is cross shaft 4 about which the arm 5 may be rotated. The frame body 5ᵃ forms a support for the projectors and at the same time enables the operator to adjust the same to his needs by manual manipulation. The arm 5 is also secured in fixed relation with the frame member 5ᵃ. Secured to the frame member 5ᵃ are suitable bracket supports 6 that are used to maintain the shaft 7 in position. The shaft 7 acts as a cross shaft to connect the projectors of the opposite side of the vehicle to the same manipulating lever system so that the same will be operated in unison with each other.

8 is a link support to which connecting rod 9 is engaged by suitable connections, which in turn is connected to the arm 10 about which the projector 11 is attached in hinged relation to pin 12. The manipulating rod 13 is attached to the hand operating lever 16 by means of suitable pin connection as shown at 14, the lever being journaled about the shaft 15 that is attached to the vehicle frame. Upon meeting approaching vehicles the projector 11 may be changed to throw the rays of light upon the roadway at or near the front of the vehicle, whereas when traveling along a roadway unmolested by traffic the same may be made to strike the roadway at or a greater distance from the vehicle, the point of projection being determinable by the will of the operator of the vehicle.

The light to be projected originates within the lamp 18 which is the primary projector, and are projected to strike upon the secondary projector 11 from where they are projected in the line of travel of the vehicle. The secondary projector has particular novelty in the shape of the same, being comparatively a true surface in the center and upon the lower edge and having a concave surface at the upper edges, the object being to diffuse the light in the line of travel of the vehicle and to spread the same in close proximity to the vehicle.

To permit the driver of the vehicle to have the greatest freedom and use from my new and improved projector I have found it desirable that he be able to raise the line of the secondary projector above the horizontal, or to divert the projected rays from the parallel line of travel of the vehicle. If it is desired to operate my device and invention wherein the projected rays are to be used at an angle other than parallel with the line of travel of the vehicle, the set screw 3 is released and an arm 19 is attached to the shank 2 to which connecting rod 20 connects the same with a hand operating lever 21. To afford the flexibility to the cross rod 7 I have provided joints 22 therein.

Having thus described my invention I wish to make the following claims, therefor—

1. A headlight projector, comprising a table support secured to the frame of a motor vehicle, a shank journaled therein, a frame body pivotally secured to said shank by a cross shaft, a primary projector secured to said frame body and adapted to project light rays upon a secondary projector, a secondary projector pivotally mounted on said frame body and adapted to project and diffuse the light rays projected upon it by the primary projector, manipulative means adapted to direct the rays from the secondary projector above and below the horizontal line of travel, and manipulative means to divert the rays from the secondary projector from the parallel line of travel of the motor vehicle.

2. A headlight projector, comprising a table support mounted on a motor vehicle frame, a shank journaled therein, a cross shaft journaled in the upper end of the shank, a frame body having an arm pivotally mounted on said cross shaft, a primary projector mounted on said frame body and adapted to project light rays upon a secondary projector, a secondary projector pivotally mounted on said frame body and adapted to project and diffuse the light rays projected upon it by the primary projector, manipulative means adapted to direct the rays from the secondary projector above and below the horizontal line of travel, and manipulative means to divert the rays from the secondary projector from the parallel line of travel of the motor vehicle.

CHARLES G. HALL.